United States Patent [19]

Bergkvist

[11] 4,245,912
[45] Jan. 20, 1981

[54] DEVICE SUCH AS AN INSTRUMENT FOR OPTICALLY, PREFERABLY VISUALLY, DETERMINING A DEFINITE PLANE

[76] Inventor: Lars A. Bergkvist, Gottne, 890 42 Mellansel, Sweden

[21] Appl. No.: 946,388

[22] Filed: Sep. 27, 1978

[30] Foreign Application Priority Data

Oct. 12, 1977 [SE] Sweden .................. 7711444

[51] Int. Cl.³ .............. G01B 11/00; G01B 11/14
[52] U.S. Cl. ............................. 356/374; 356/399
[58] Field of Search ............ 356/374, 399, 373, 356, 356/395; 250/237 G, 231 R; 350/162 R

[56] References Cited

U.S. PATENT DOCUMENTS 3,604,813  9/1971  Te Kronnie et al. ............ 356/374 X Primary Examiner—Vincent P. McGraw
Assistant Examiner—Rodney B. Bovernick
Attorney, Agent, or Firm—Silverman, Cass & Singer, Ltd.

[57] ABSTRACT

A parallelepiped box is provided with three screens of parallel opaque lines, forming a definite plane, separated by transparent interspaces, and with a mirror behind the screens to direct ambient light from an opening in the top of the box through the screens. A forward screen is provided in the front of the box. Two rearward screens are behind the forward screen with one screen at an angle with the forward screen, the angle being in the definite plane formed by the parallel lines. Light enters the box through a diffuser in the opening and is directed through the screens to produce moire patterns indicating whether an observation is made above, below or in the definite plane. A second mirror may be provided above the opening to direct ambient light thereinto or a light source may be located above the opening to provide light thereto.

4 Claims, 5 Drawing Figures

U.S. Patent  Jan. 20, 1981  4,245,912
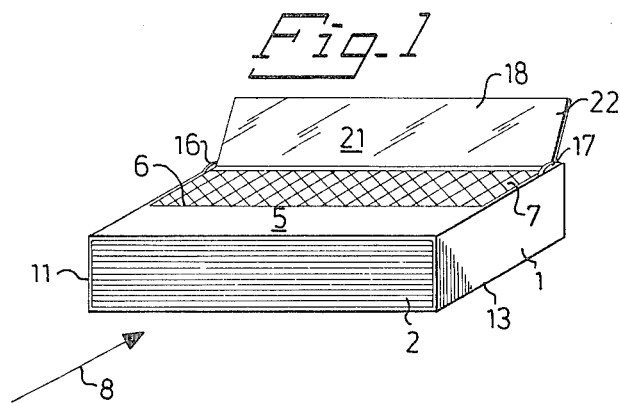
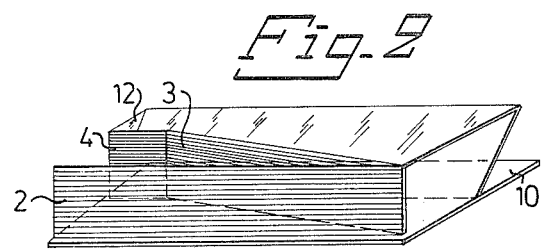
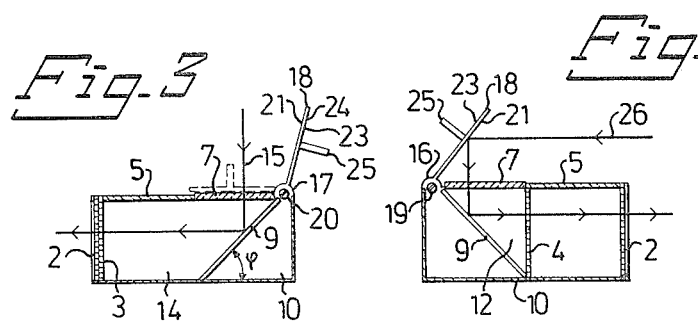
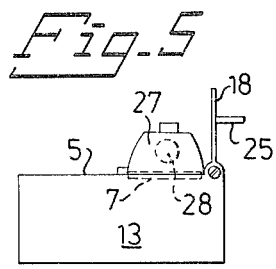

DEVICE SUCH AS AN INSTRUMENT FOR OPTICALLY, PREFERABLY VISUALLY, DETERMINING A DEFINITE PLANE

BACKGROUND OF THE INVENTION

This invention relates to a device such as an instrument for optically, preferably visually determining a definite plane.

Such an instrument is of the kind as set forth in the U.S. Pat. application Ser. No. 841,121 now U.S. Pat. No. 4,166,699.

The instrument according to said U.S. Patent is of such a nature, that by observation of the instrument information is obtained as to which side of a certain plane defined by the instrument the observing person or an object is located, or whether the observing person or the object is located in said plane. The instrument comprises screens of opaque lines, which are separated by transparent interspaces. The screens are disposed in such a manner relative to each other that a certain distinct interference pattern, a so-called moire pattern, is formed when the observer or an object is in said plane, and that other distinct moire patterns are formed when the observing person or an object is outside said plane. The screens usually are located in a box of sheet metal or another rain- and wind-proof material. In the rear end wall of the box a light opening is provided. In such a device light is transmitted through the screens to the observer who thereby sees the moire patterns which have been formed.

The instrument is used mainly outdoors, for example for levelling the ground at road and building construction sites, etc., in which cases the plane defined by the instrument preferably is parallel with the desired ground plane.

When the instrument is used outdoors, it is difficult during parts of the day and for long periods of the year to see the moire pattern, because the intensity of the light transmitted through the screens is too low. In order to increase the intensity, artificial lighting can be applied at the light opening on the rear side of the instrument. The artificial lighting, however, when it is used during large parts of the day as it must be during the winter term, causes extra troubles with respect to the necessary availability of lighting accessories, exchange of batteries, lamps etc.

It is, therefore, desired to reduce the time when artificial lighting is required.

SUMMARY OF THE INVENTION

A parallelepiped box is provided with three screens of opaque lines separated by transparent interspaces and a mirror behind the screens to direct light from an opening in the top of the box through the screens. The opaque lines are parallel with each other and form a definite plane. A forward screen is provided in the front wall of the box. A first rearward screeeen is located behind the forward screen at an angle thereto with the angle being in a plane formed by the parallel lines. A second rearward screen is located behind the forward screen adjacent the second rearward screen. The mirror is located behind the three screens at an angle of 45° to the plane of the forward screen to direct light passing through a diffuser in an opening in the top of the box through the screens to produce moire patterns indicating whether an observation is being made above, below or in the definite plane.

A mirror may be provided over the opening outside the box to direct ambient light to the opening and a light source may be located over the opening to provide light to the box. The device according to the invention reduces very substantially the time when artificial lighting is necessary, and in certain cases artificial lighting can be abstained from entirely. The invention further offers the advantage that a higher intensity of the transmitted light can be obtained even in full daylight than it can be obtained with known devices.

BRIEF DESCRIPTION OF THE DRAWINGS

The invention is described in greater detail in the following, with reference to the accompanying drawing, in which FIG. 1 is a perspective view of an instrument, to which the device according to the invention is applied, FIG. 2 is a perspective view of the instrument according to FIG. 1 where all walls except the bottom surface have been removed, FIG. 3 is a sectional elevation view along the right-hand side surface of FIG. 1, FIG. 4 is a sectional elevation view along the left-hand side surface of FIG. 1, FIG. 5 is a side elevational view of the instrument,

DESCRIPTION OF THE PREFERRED EMBODIMENT

In FIG. 1 an instrument 1 is shown which comprises a substantially parallelepiped outer box, which is provided at its forward short side or wall with a forward screen 2 and a first rearward screen 3 and preferably a second rearward screen 4. See FIG. 2. The first rearward screen 3 forms an angle with the forward screen 2, and the second rearward screen 4 is parallel with the forward screen 2. The screen lines of all screens 2,3,4 which are shown slightly enlarged, are parallel relative to each other. The angle between the forward screen 2 and the first rearward screen 3 being in a plane formed by the parallel lines.

In the upper surface or wall 5 an opening 6 is located, which is covered by a plate 7 of a transparent uneven material, preferably a plate of prism-pressed plastic, preferably acryl. Said opening 6 extends rearward, seen in the observation direction of the instrument marked by the arrow 8, from the second rearward screen 4 to the upper edge of a first mirror 9. The lower edge of said mirror 9 is in parallel with the forward screen 2 and located immediately behind the most rearward screen, preferably thus behind the second rearward screen 4. The mirror 9 extends rearward and upward and forms an angle φ of preferably 45° with the plane, in which the forward screen 2 is located, i.e. 45° to the bottom surface or wall 10 of the instrument. The plate 7 in the opening 6, thus, is at least great enough to cover the surface constituted by the projection of the mirror 9 perpendicularly on the upper surface 5.

In FIG. 4 a section along the left-hand side surface or wall 11 of FIG. 1 is shown, from which the aforesaid location of the mirror 9 is apparent. The triangular area formed by the mirror 9, plate 7 and the second rearward screen 4 is covered by a second mirror 12, which preferably is attached on the inside of the left-hand side surface or wall 11, the mirror surface of mirror 12 facing to the interior of the instrument. In FIG. 3 a section along the right-hand side surface, or wall 13 of FIG. 1 is shown. The trapezoid area formed by the mirror 9, plate 7, upper wall 5, the first rearward screen 3 and the bottom surface 10 is covered, in the same way as said triangular area, by a third mirror 14, which preferably is attached on the inside of the right-hand side wall 13, the mirror surface of mirror 14 facing to the interior of the instrument.

The embodiment described above implies, that all surfaces, except the bottom wall 10 and the upper wall 5, behind the rearward screens 3,4 are covered by mirrors 9,12 and 14.

In FIG. 3 the beam path 15 is shown in principle for the case where light is incident from above, i.e. normal daylight. The light passes from above through the plate 7. After having been transmitted through the plate 7, the light is disordered and has a substantially uniform intensity along the lower surface of the plate 7. The light thereafter is reflected against the mirror 9 and transmitted through the screens 2,3 and 4. Because the plate 7 reduces possible reflections incident to the instrument and contains the light with a high intensity in certain wave propagation planes, the moire patterns are produced by the instrument are of uniform intensity. The plate 7, as already mentioned, preferably is made of prism-pressed plastic, which implies that light inciding at different angles on the plate 7 is reflected by the prims down against the mirror 9. The second mirror 12 and the third mirror 14 in the instrument contribute to bringing about a high light intensity through the screens 2,3 and 4.

According to one embodiment, a plate or member 18 is hingedly attached by joints 16,17 on the upper wall 5 behind the transparent plate 7, seen in the observation direction 8. The angular position of the member 18 relative to the upper wall 5 can be locked by screws 19,20. The member 18 includes a fourth mirror 21 on its lower surface 22 and a plate 23 of plastic or sheet metal on its upper surface 24. A handle 25 may be provided on its upper surface, too. The hinged member 18 is sufficiently large, when in the folded-down position as shown by the dashed in FIG. 3, to cover the entire transparent plate 7 and, thus, to protect said plate.

The mirrors can be of a suitable known type, but preferably the mirrors are of acryl.

When the instrument is used in general darkness or at dusk, but with access to light from lamps, for example for lighting a construction site, the mirror 21 of the hinged member 18 is directed to this light so that the beams are reflected down against the first mirror 9. Owing to the mirror 21, thus, artificial universal lighting can be used to bring about necessary light intensity through the screens 2,3 and 4.

In many cases machines are used, which are driven back and forth in order to level the ground. The machines then are driven toward an instrument, on which the driver can read his position in the horizontal plane. The hinged mirror 21 is very suitable for use in this case. The mirror 21 is set at an angle of about 45° to the upper wall 5 of the instrument. The lamp or headlights of the machine lights the mirror 21, which reflects the light down against the first mirror 9 in a way as shown schematically in FIG. 4 by the beam path 26.

When no artificial or universal lighting is available for use, a lighting arrangement 27 can be mounted above the transparent plate 7 as shown in FIG. 5. Said lighting arrangement 27 comprises lamps 28 or fluorescent tubes and preferably also batteries.

The invention must not be regarded restricted to the embodiments described above, but can be varied within the scope of the attached claims. The set of screens, for example, and also the design of the box may be varied without abandoning the idea of the invention. The screen set, for example, may comprise two or more screen sets of the above kind placed above each other.

I claim:

1. A device for optically determining a definite plane defined by said device, comprising:
   a prallelepiped box having opposed front and rear walls and opposed top and bottom walls;
   a forward screen of opaque lines separated by transparent interspaces provided in the front wall of the box;
   a first rearward screen of opaque lines separated by transparent interspaces provided between the forward screen and the rear wall of the box, the opaque lines of the forward and first rearward screens being parallel with one another and the first rearward screen being arranged at an angle with the forward screen with the angle being in a plane formed by said parallel opaque lines;
   a second rearward screen of opaque lines separated by transparent interspaces provided between said forward screen and said rear wall and parallel with said forward screen, the opaque lines of said forward, first rearward and second rearward screens being parallel with one another and forming said definite plane;
   a mirror located between said screens and said rear wall with a portion of the lower edge of the mirror adjacent the lower edge of the second rearward screen and the mirror extending upward and rearward of the box at an angle of substantially 45° to the plane of the forward screen;
   said box being provided with an opening in the top wall adjacent said mirror which is at least as large as the projection of said mirror on and perpendicular to said top wall; and
   a plate of prism-oressed, plastic, transparent, material covering said opening, so that moire patterns formed by light passing through the plate and the three screens may be observed, and from which information is obtained concerning whether the observation is being made above, below or in said definite plate defined by said device.

2. The device as claimed in claim 1 in which said box includes two opposed side walls with said second rearward screen adjacent one sidewall and the angle between said forward and first rearward screens adjacent the other sidewall, a portion of the interior of said one side wall defined by said mirror, said upper wall and the second rearward screen being convered with a second mirror and a portion of the other side wall defined by said mirror, said topwall, said first rearward screen and said bottom wall being covered with a third mirror.

3. The device as claimed in claim 1 or 2 in which there is a member hinged along one edge thereof to the top wall rearward of said plate, said member including a fourth mirror on a surface adjacent said plate which has a size equal to said plate and which will cover said plate when the member is swung down on said plate and the mirror being provided so that light incident to the device may be reflected by said mirror against the plate.

4. The device as claimed in claim 3 in which there is an artificial light source located on said box above said plate so as to provide light to the plate.

* * * * *